UNITED STATES PATENT OFFICE.

SPENCER BAIRD NEWBERRY, OF SANDUSKY, OHIO.

BASIC FIRE-BRICK COMPOUND.

SPECIFICATION forming part of Letters Patent No. 677,688, dated July 2, 1901.

Application filed February 15, 1900. Serial No. 5,354. (No specimens.)

*To all whom it may concern:*

Be it known that I, SPENCER BAIRD NEWBERRY, a citizen of the United States, and a resident of Sandusky, in the county of Erie and State of Ohio, have invented a Basic Fire-Brick Compound, consisting, essentially, of silica, alumina, lime, and magnesia, especially adapted for use as a lining in cement and lime kilns, the composition and mode of preparation of which are as follows:

Dolomite lime, consisting chiefly of calcium oxid and magnesium oxid obtained by calcining dolomite limestone, is intimately mixed and finely ground with, first, clay, in about the proportion required to convert the lime present into Portland-cement clinker, consisting chiefly of tricalcium silicate ($3CaO.SiO_2$) and dicalcium aluminate, ($2CaO.Al_2O_3$,) and, second, silica in about the proportion necessary to convert the lime present into tricalcium silicate, ($3CaO.SiO_2$.) The resulting mixture is moistened with a very small amount of water (five to ten per cent.) and forced under heavy pressure into molds of the desired shape and the blocks so obtained calcined at a high temperature, as in the manufacture of ordinary fire-brick.

Instead of dolomite lime a corresponding quantity of unburned limestone may be employed.

The clay used may be common silicious clay or fire-clay. The silica may be in the form of finely-ground sand or sandstone. The amount of clay or silica used should be such as to fix the lime present and deprive it of all tendency to slake or expand on long exposure to air or moisture. The proportions necessary for this purpose are: clay, about fifty per cent. of the amount of lime present, and silica about thirty-six per cent. of the amount of lime present.

A typical dolomite lime made by calcining a typical dolomite consists of 58.3 per cent. lime and 41.7 per cent. magnesia. It will therefore require the addition of about thirty per cent. clay or twenty-one per cent. silica.

A compound of approximately the same composition as that made from clay and dolomite lime may also be prepared by calcining a mixture of commercial Portland cement with about fifty per cent. of magnesia or calcined magnesite, and this method of preparation, though more costly than that from clay and dolomite lime, is claimed by me as part of my invention.

I am aware that a mixture of silica with a very small proportion of dolomite lime (four to five per cent.) has already been patented as a refractory material. Such a mixture, on account of the predominance of silica, belongs to the class of acid refractory materials and is not claimed by me as part of my invention. I am also aware that a mixture consisting of about ninety-two parts calcined magnesia or calcined dolomite and about eight parts clay and also calcined magnesian limestone containing two and one-half to nine per cent. silica and one and one-half to five per cent. alumina and oxid of iron mixed with tar have been patented as refractory materials. These mixtures, owing to the small proportion of clay contained in them, have the disadvantage of slaking on prolonged exposure to moist air. In my invention, on the other hand, the mixture contains such a proportion of clay or silica that on calcination all the lime becomes combined, and a permanent product results. The resulting product is basic and permanent, non-slaking on exposure to air, contains no free lime, and consists, essentially, of tricalcium silicate, dicalcium aluminate, and free magnesia when made with clay and of tricalcium silicate and free magnesia when made with silica.

Having thus described my invention, what I claim as new, and desire to secure by Letters Patent, is as follows:

1. The herein-described refractory compound, which consists essentially of tricalcium silicate and free magnesia and contains no free lime, said compound being basic and permanent, and non-slaking on exposure to air.

2. The herein-described refractory compound, which consists essentially of tricalcium silicate, dicalcium aluminate and free magnesia, and contains no free lime, said compound being basic and permanent, and non-slaking on exposure to air.

In testimony whereof I have signed my name to this specification in the presence of two subscribing witnesses.

SPENCER BAIRD NEWBERRY.

Witnesses:
W. C. SPRAU,
HENRY C. EHRHARDT.